United States Patent
Tanaka

(10) Patent No.: US 6,922,594 B2
(45) Date of Patent: Jul. 26, 2005

(54) CONTROLLING DEVICE AND CONTROLLING METHOD FOR CONTROL WITHIN A PREDETERMINED ENERGY CONSUMPTION AMOUNT

(75) Inventor: Masato Tanaka, Tokyo (JP)

(73) Assignee: Yamatake Corporation, Tokyo (JP)

( * ) Notice: Subject to any disclaimer, the term of this patent is extended or adjusted under 35 U.S.C. 154(b) by 181 days.

(21) Appl. No.: 10/343,901

(22) PCT Filed: Aug. 6, 2001

(86) PCT No.: PCT/JP01/06731

§ 371 (c)(1),
(2), (4) Date: Aug. 1, 2003

(87) PCT Pub. No.: WO02/12967

PCT Pub. Date: Feb. 14, 2002

(65) Prior Publication Data

US 2004/0024474 A1 Feb. 5, 2004

(30) Foreign Application Priority Data

Aug. 4, 2000 (JP) .................. 2000-236671

(51) Int. Cl.[7] ............................. G05B 13/02
(52) U.S. Cl. .................. 700/34; 700/8; 700/36; 700/42; 700/54
(58) Field of Search ............. 700/8, 28, 32–37, 700/42, 54, 71

(56) References Cited

U.S. PATENT DOCUMENTS

| | | | |
|---|---|---|---|
| 4,143,415 A | | 3/1979 | Klingbeil |
| 5,247,432 A | * | 9/1993 | Ueda ........................... 700/42 |
| 5,457,625 A | * | 10/1995 | Lim et al. ...................... 700/29 |
| 5,682,309 A | * | 10/1997 | Bartusiak et al. ............. 700/29 |

FOREIGN PATENT DOCUMENTS

| | | | | |
|---|---|---|---|---|
| JP | 61-061675 A | | 3/1986 | |
| JP | 01096598 A | * | 4/1989 | ............ G21D/3/00 |
| JP | 01214901 A | * | 8/1989 | ........... G05B/11/26 |
| JP | 03097009 A | * | 4/1991 | ........... G05B/23/02 |
| JP | 04-299701 A | | 10/1992 | |
| JP | 06-102903 A | | 4/1994 | |

* cited by examiner

Primary Examiner—Anthony Knight
Assistant Examiner—Crystal J Barnes
(74) Attorney, Agent, or Firm—Blakely Sokoloff Taylor & Zafman

(57) ABSTRACT

A preferential upper limit processing section L_MH1 limits the value of a pre-input manipulated variable output upper limit MH1 so as to adjust a manipulated variable output MV1 of a preferential controller PID1 to a predetermined value MT1 or less. A non-preferential upper limit calculating section C_MH2 calculates a manipulated variable output upper limit MH2 of a non-preferential controller PID2 so as to adjust the sum of manipulated variable outputs MV1 and MV2 to the predetermined value MT1 or less. A preferential upper limit calculating section C_MH1 performs calculation of increasing/decreasing the manipulated variable output upper limit MH1 of the controller PID1 in accordance with the margin of the manipulated variable output MV2 of the controller PID2 with respect to the manipulated variable output upper limit value MH2, and sets the calculated value as a manipulated variable output upper limit value MH1' in the next control cycle.

8 Claims, 4 Drawing Sheets

CONTROLLING DEVICE AND CONTROLLING METHOD FOR CONTROL WITHIN A PREDETERMINED ENERGY CONSUMPTION AMOUNT

The present patent application is a non-provisional application of International Application No. PCT/JP01/06731, filed Aug. 6, 2001.

BACKGROUND OF THE INVENTION

The present invention relates to a controlling device and controlling method which perform control using a plurality of controllers within a predetermined energy consumption amount.

There has conventionally been known an apparatus (e.g., a semiconductor manufacturing apparatus using an electric heater as an actuator) which has a plurality of loops of a control system within one apparatus. This apparatus can prioritize and control the controllers of the respective control loops when the control characteristics of all the control loops are not so important. Controlling the controllers with priorities can suppress the power consumption amount (i.e., energy consumption amount). Assume that two control loops exist for a maximum heater output of 400 W. If these two controllers are controlled without any priority, the power equipment such as a power supply must provide 800 W; if these controllers are prioritized and controlled, the power equipment can be downsized.

Controllers are prioritized and controlled by a conventional method (to be referred to as the first prior art hereinafter) of sequentially operating them from a high-priority controller and operating lower-priority controllers within the remaining ability (feedable power amount). As another method, the abilities of controllers are lowered in accordance with a controller having the lowest operation speed (to be referred to as the second prior art hereinafter).

In the first prior art, a high-priority controller excessively takes precedence, and a low-priority controller hardly functions, failing to obtain the controllability of the low-priority controller. To operate even the low-priority controller, the ability of the overall apparatus must be increased, resulting in a large energy consumption amount and a bulky apparatus. In the first prior art, when controllers are set such that they operate within only fixed abilities designed in advance for the respective controllers on the basis of priority, the usable ability of the overall apparatus cannot be used up, leaving an unused ability.

In the second prior art, the ability of a high-priority controller is wasted. This means that a low-ability controller suffices to be used from the first, and sacrifices the controllability.

SUMMARY OF THE INVENTION

The present invention has been made to overcome the conventional drawbacks, and has as its object to provide a controlling device and controlling method capable of satisfying both the controllability and energy consumption amount of each controller within an acceptable range.

A controlling device according to the present invention comprises (1) a preferential controller (PID1) which calculates a manipulated variable output (MV1) in accordance with a first manipulated variable output upper limit (MH1), (2) a non-preferential controller (PID2) which calculates a manipulated variable output (MV2) in accordance with a second manipulated variable output upper limit (MH2), (3) a preferential upper limit processing section (L_MH1) which limits a value of the first manipulated variable output upper limit input in advance and gives the first manipulated variable output upper limit to the preferential controller so as to adjust the manipulated variable output of the preferential controller to not more than a predetermined value (MT1) representing a manipulated variable output upper limit of a whole apparatus, (4) a non-preferential upper limit calculating section (C_MH2) which calculates the second manipulated variable output upper limit and gives the second manipulated variable output upper limit to the non-preferential controller so as to adjust a sum of the manipulated variable outputs of the preferential and non-preferential controllers to not more than the predetermined value, and (5) a preferential upper limit calculating section (C_MH1) which performs calculation of increasing/decreasing the first manipulated variable output upper limit in accordance with a margin of the manipulated variable output of the non-preferential controller with respect to the second manipulated variable output upper limit, and gives a calculated value as the first manipulated variable output upper limit (MH1') in a next control cycle to the preferential upper limit processing section.

A controlling device according to the present invention comprises (1) first to mth controllers (PID1–PIDm) which are assigned first to mth (m is n−1) priorities in advance and calculate manipulated variable outputs (MV1–MVm) in accordance with first to mth corresponding manipulated variable output upper limits (MH1–MHm), (2) an nth controller (PIDn) which is assigned a lowest priority in advance and calculates a manipulated variable output (MVn) in accordance with an nth manipulated variable output upper limit (MHn), (3) first to mth preferential upper limit processing sections (L_MH1–L_MHm) which are arranged for k (k is an integer of 1 to m) controllers, limit a value of a kth manipulated variable output upper limit input in advance, and give the k manipulated variable output upper limit to a kth controller so as to adjust a sum of the manipulated variable outputs of the first to kth controllers to not more than a predetermined value (MT1) representing a manipulated variable output upper limit of a whole apparatus, (4) a non-preferential upper limit calculating section (C_MHn) which calculates the nth manipulated variable output upper limit and gives the nth manipulated variable output upper limit to the nth controller so as to adjust a sum of the manipulated variable outputs of the first to mth and nth controllers to not more than the predetermined value, and (5) first to mth preferential upper limit calculating sections (C_MH1–C_MHm) which are arranged for the k controllers, perform calculation of increasing/decreasing the k manipulated variable output upper limit in accordance with a margin of the manipulated variable outputs of a (k+1)th controller with respect to a (k+1)th manipulated variable output upper limit, and give a calculated value as the kth manipulated variable output upper limit (MH1'–MHm') in a next control cycle to a kth preferential upper limit processing section.

As an arrangement example of the controlling device according to the present invention, the preferential upper limit calculating section increases the first manipulated variable output upper limit when the manipulated variable output of the non-preferential controller has a margin with respect to the second manipulated variable output upper limit, decreases the first manipulated variable output upper limit when the manipulated variable output does not have any margin, and changes a degree of decrease in accordance with priority of the preferential controller with respect to the non-preferential controller.

As another arrangement example of the controlling device according to the present invention, the kth preferential upper limit calculating section for the kth controller increases the kth manipulated variable output upper limit when the manipulated variable output of the (k+1)th controller has a margin with respect to the (k+1)th manipulated variable output upper limit, decreases the kth manipulated variable output upper limit when the manipulated variable output does not have any margin, and changes a degree of decrease in accordance with priority of the kth controller with respect to the (k+1)th controller.

In a controlling device which performs control using two, preferential and non-preferential controllers within a predetermined energy consumption amount, a control method according to the present invention comprises repetitively performing (1) preferential upper limit processing of limiting a value of a first manipulated variable output upper limit (MH1) input in advance so as to adjust a manipulated variable output of the preferential controller (PID1) to not more than a predetermined value (MT1) representing a manipulated variable output upper limit of a whole apparatus, (2) preferential manipulated variable output calculation processing of calculating a manipulated variable output (MV1) by the preferential controller in accordance with the first manipulated variable output upper limit, (3) non-preferential upper limit calculation processing of calculating a second manipulated variable output upper limit (MH2) so as to adjust a sum of manipulated variable outputs of the preferential controller and the non-preferential controller (PID2) to not more than the predetermined value, (4) non-preferential manipulated variable output calculation processing of calculating a manipulated variable output (MV2) by the non-preferential controller in accordance with the second manipulated variable output upper limit, and (5) preferential upper limit calculation processing of performing calculation of increasing/decreasing the first manipulated variable output upper limit in accordance with a margin of the manipulated variable output of the non-preferential controller with respect to the second manipulated variable output upper limit, and giving a calculated value as the first manipulated variable output upper limit in a next control cycle to the preferential upper limit processing.

In a controlling device which performs control using n controllers assigned first to nth (n is an integer of not less than three) priorities in advance within a predetermined energy consumption amount, a control method according to the present invention comprises performing (1) first preferential upper limit processing of limiting a value of a first manipulated variable output upper limit (MH1) input in advance so as to adjust a manipulated variable output of a first controller (PID1) to not more than a predetermined value (MT1) representing a manipulated variable output upper limit of a whole apparatus, (2) first preferential manipulated variable output calculation processing of calculating a manipulated variable output (MV1) by the first controller in accordance with the first manipulated variable output upper limit, (3) second preferential upper limit processing of calculating a second manipulated variable output upper limit (MH2) so as to adjust a sum of manipulated variable outputs of the first controller and a second controller (PID2) to not more than the predetermined value, (4) second preferential manipulated variable output calculation processing of calculating a manipulated variable output (MV2) by the second controller in accordance with the second manipulated variable output upper limit, and (5) first preferential upper limit calculation processing of performing calculation of increasing/decreasing the first manipulated variable output upper limit in accordance with a margin of the manipulated variable output of the second controller with respect to the second manipulated variable output upper limit, and giving a calculated value as the first manipulated variable output upper limit in a next control cycle to the first preferential upper limit processing, sequentially performing (6) three processes for i (i is an integer of 3 to m) controllers: ith preferential upper limit processing of limiting a value of an ith manipulated variable output upper limit input in advance so as to adjust a sum of manipulated variable outputs of the first to ith controllers to not more than the predetermined value, ith preferential manipulated variable output calculation processing of calculating the manipulated variable output by the ith controller in accordance with the ith manipulated variable output upper limit, and (i−1)th preferential upper limit calculation processing of performing calculation of increasing/decreasing an (i−1)th manipulated variable output upper limit in accordance with a margin of the manipulated variable output of the ith controller with respect to the ith manipulated variable output upper limit, and giving a calculated value as the (i−1)th manipulated variable output upper limit in a next control cycle to the (i−1)th preferential upper limit processing, performing (7) non-preferential upper limit calculation processing of calculating an nth manipulated variable output upper limit so as to adjust a sum of manipulated variable outputs of the first to mth and nth controllers to not more than the predetermined value, (8) non-preferential manipulated variable output calculation processing of calculating a manipulated variable output (MVn) by the nth controller in accordance with the nth manipulated variable output upper limit, and (9) mth preferential upper limit calculation processing of performing calculation of increasing/decreasing an mth manipulated variable output upper limit in accordance with a margin of the manipulated variable output of the nth controller with respect to the nth manipulated variable output upper limit, and giving a calculated value as the mth manipulated variable output upper limit (MHm') in a next control cycle to mth preferential upper limit processing, and repetitively performing processing in (1) to (9).

As a processing example of the control method according to the present invention, the preferential upper limit calculation processing includes processing of increasing the first manipulated variable output upper limit when the manipulated variable output of the non-preferential controller has a margin with respect to the second manipulated variable output upper limit, decreasing the first manipulated variable output upper limit when the manipulated variable output does not have any margin, and changing a degree of decrease in accordance with priority of the preferential controller with respect to the non-preferential controller.

As another processing example of the control method according to the present invention, kth preferential upper limit calculation processing for the kth (k is an integer of 1 to m) controller includes processing of increasing the kth manipulated variable output upper limit when a manipulated variable output of the (k+1)th controller has a margin with respect to the (k+1)th manipulated variable output upper limit, decreasing the kth manipulated variable output upper limit when the manipulated variable output does not have any margin, and changing a degree of decrease in accordance with priority of the kth controller with respect to the (k+1)th controller.

DETAILED DESCRIPTION OF THE PREFERRED EMBODIMENTS

[First Embodiment]

Figure 1:
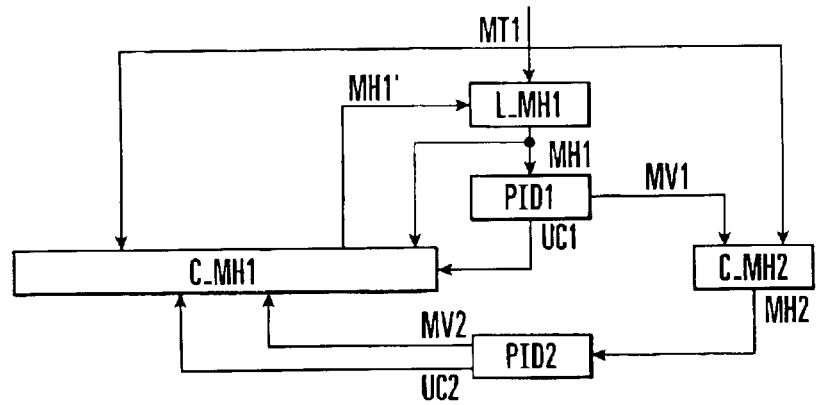
FIG. 1 is a block diagram showing the arrangement of a controlling device according to the first embodiment of the present invention.

The first embodiment of the present invention will be described in detail below with reference to the accompanying drawings. FIG. 1 is a block diagram showing the arrangement of a controlling device according to the first embodiment of the present invention. The controlling device in FIG. 1 comprises a preferential controller PID1, non-preferential controller PID2, preferential upper limit processing section L_MH1, non-preferential upper limit calculating section C_MH2, and preferential upper limit calculating section C_MH1.

When the control characteristics of control loops are not so important in an apparatus (semiconductor manufacturing apparatus or the like) having two loops of a control system using, e.g., an electric heater as an actuator in one apparatus, the first embodiment can be applied to these two loops. In this case, the controller of a control loop whose control characteristic is important is a preferential controller, and the controller of a control loop whose control characteristic is not so important is a non-preferential controller.

Figure 2:
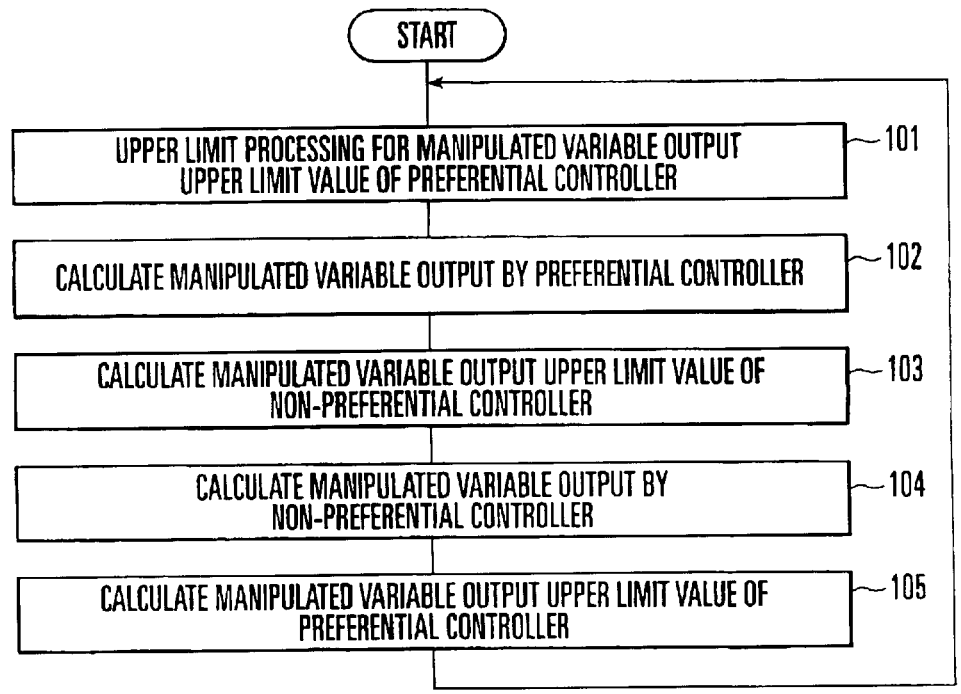
FIG. 2 is a flow chart showing the operation of the controlling device in FIG. 1.

The operation of the controlling device according to the first embodiment will be explained. FIG. 2 is a flow chart showing the operation of the controlling device in FIG. 1. The preferential upper limit processing section L_MH1 compares a manipulated variable output upper limit value MH1 representing the upper limit of a manipulated variable output MV1 from the preferential controller PID1 with a predetermined value MT1 (e.g., 100%) representing a preset manipulated variable output upper limit of the whole apparatus. If the manipulated variable output upper limit value MH1 is larger than the predetermined value MT1, the preferential upper limit processing section L_MH1 executes upper limit processing of setting MH1=MT1, i.e., setting the predetermined value MT1 as a new manipulated variable output upper limit value MH1 (step 101 in FIG. 2).

The preferential upper limit processing section L_MH1 outputs the updated manipulated variable output upper limit value MH1 to the preferential controller PID1 and preferential upper limit calculating section C_MH1. If the manipulated variable output upper limit value MH1 is equal to or smaller than the predetermined value MT1, the preferential upper limit processing section L_MH1 need not update the manipulated variable output upper limit value MH1 and directly outputs the current manipulated variable output upper limit value MH1. The default value of the manipulated variable output upper limit value MH1 in the first control cycle is set to, e.g., 100%.

The preferential controller PID1 executes PID calculation to calculate the manipulated variable output MV1 (step 102).

In step 102, the preferential controller PID1 calculates by PID calculation an internal output value UC1 as a manipulated variable before upper limit processing based on the manipulated variable output upper limit value MH1:

$$UC1 = Kg1\{1 + 1/(Ti1\ s) + Td1\ s\}(SP1 - PV1) \quad (1)$$

where Kg1 is the proportional gain of the controller PID1, Ti1 is the integral time of the controller PID1, Td1 is the derivative time of the controller PID1, SP1 is the set point set for an object (not shown) to be controlled by the controller PID1, and PV1 is the controlled variable of this object. The proportional gain Kg1, integral time Ti1, derivative time Td1, and set point SP1 are set in advance, and the controlled variable PV1 is detected by a sensor (not shown).

The preferential controller PID1 compares the calculated internal output value UC1 and the manipulated variable output upper limit value MH1 output from the preferential upper limit processing section L_MH1. If the internal output value UC1 is larger than the manipulated variable output upper limit value MH1, the preferential controller PID1 executes upper limit processing of setting MV1=MH1, i.e., setting the manipulated variable output upper limit value MH1 as the manipulated variable output MV1. If the internal output value UC1 is equal to or smaller than the manipulated variable output upper limit value MH1, the preferential controller PID1 sets MV1=UC1, i.e., sets the internal output value UC1 as the manipulated variable output MV1.

The preferential controller PID1 outputs the calculated manipulated variable output MV1 to the object to be controlled (not shown) and the non-preferential upper limit calculating section C_MH2. At the same time, the preferential controller PID1 outputs the internal output value UC1 to the preferential upper limit calculating section C_MH1.

Processing in step 102 then ends.

The non-preferential upper limit calculating section C_MH2 calculates a manipulated variable output upper limit value MH2 representing the upper limit of a manipulated variable output MV2 from the non-preferential controller PID2, and outputs the manipulated variable output upper limit value MH2 to the non-preferential controller PID2 (step 103):

$$MH2 = MT1 - MV1 \quad (2)$$

The non-preferential controller PID2 executes PID calculation to calculate the manipulated variable output MV2 (step 104).

In step 104, the non-preferential controller PID2 calculates by PID calculation an internal output value UC2 as a manipulated variable before upper limit processing based on the manipulated variable output upper limit value MH2:

$$UC2 = Kg2\{1 + 1/(Ti2\ s) + Td2\ s\}(SP2 - PV2) \quad (3)$$

where Kg2 is the proportional gain of the controller PID2, Ti2 is the integral time of the controller PID2, Td2 is the derivative time of the controller PID2, SP2 is the set point set for an object (not shown) to be controlled by the controller PID2, and PV2 is the controlled variable of this object. The proportional gain Kg2, integral time Ti2, derivative time Td2, and set point SP2 are set in advance, and the controlled variable PV2 is detected by a sensor (not shown).

The non-preferential controller PID2 compares the calculated internal output value UC2 and the manipulated variable output upper limit value MH2 output from the non-preferential upper limit calculating section C_MH2. If the internal output value UC2 is larger than the manipulated variable output upper limit value MH2, the non-preferential controller PID2 executes upper limit processing of setting MV2=MH2, i.e., setting the manipulated variable output upper limit value MH2 as the manipulated variable output MV2. If the internal output value UC2 is equal to or smaller than the manipulated variable output upper limit value MH2, the non-preferential controller PID2 sets MV2=UC2, i.e., sets the internal output value UC2 as the manipulated variable output MV2.

The non-preferential controller PID2 outputs the calculated manipulated variable output MV2 to the object to be controlled (not shown) and the preferential upper limit calculating section C_MH1. At the same time, the non-preferential controller PID2 outputs the internal output value UC2 to the preferential upper limit calculating section C_MH1.

Processing in step 104 then ends.

The preferential upper limit calculating section C_MH1 calculates a manipulated variable output upper limit value MH1' in the next control cycle for the preferential controller PID1 (step 105).

In step 105, the preferential upper limit calculating section C_MH1 checks whether the following inequality is established on the basis of the internal output value UC2 and manipulated variable output MV2 output from the non-preferential controller PID2:

$$\alpha(UC2-MV2)>0 \quad (4)$$

where α is the priority coefficient representing the control priority of the preferential controller PID1 with respect to the non-preferential controller PID2, and takes a real number of 0 to 1 (priority is highest for 0, and lowest for 1).

If inequality (4) is established, the preferential upper limit calculating section C_MH1 calculates by the following equation the manipulated variable output upper limit value MH1' in the next control cycle for the preferential controller PID1 on the basis of the manipulated variable output upper limit value MH1 in the current control cycle output from the preferential upper limit processing section L_MH1, the internal output value UC1 output from the preferential controller PID1, and the manipulated variable output MV2 and internal output value UC2 output from the non-preferential controller PID2. The preferential upper limit calculating section C_MH1 outputs the manipulated variable output upper limit value MH1' to the preferential upper limit processing section L_MH1:

$$MH1'=[MH1\ Tx1+\{UC1-\alpha(UC2-MV2)\}dT]/(Tx1+dT) \quad (5)$$

where Tx1 is the transition time and, e.g., Tx1=Td1, and dT is the control cycle.

If inequality (4) is not established, the preferential upper limit calculating section C_MH1 calculates the manipulated variable output upper limit value MH1' on the basis of the predetermined value MT1, and the manipulated variable output upper limit value MH1 in the current control cycle output from the preferential upper limit processing section L_MH1, and outputs the manipulated variable output upper limit value MH1' to the preferential upper limit processing section L_MH1:

$$MH1'=[MH1\ Tx1+MT1\ dT]/(Tx1+dT) \quad (6)$$

Processing in step 105 then ends.

Steps 101 to 105 are defined as processing in one control cycle, and processing from step 101 to step 105 is repeated every control cycle dT.

Note that the preferential upper limit processing section L_MH1 executes processing in step 101 by setting MH1=MH1', i.e., setting, as the manipulated variable output upper limit value MH1 in the current control cycle, the manipulated variable output upper limit value MH1' calculated and output from the preferential upper limit calculating section C_MH1 in the preceding control cycle.

In this manner, in the first embodiment, the manipulated variable output upper limit value MH2 of the non-preferential controller PID2 is set to MT1–MV1 (step 103) in order to always maintain the sum of the manipulated variable output MV1 of the preferential controller PID1 and the manipulated variable output MV2 of the non-preferential controller PID2 at the predetermined value MT1 (e.g., 100%) or less. If inequality (4) is not established, i.e., the internal output value UC2 of the non-preferential controller PID2 has a margin with respect to the manipulated variable output upper limit value MH2 (UC2≦MH2), the manipulated variable output upper limit value MH1 of the preferential controller PID1 is increased using equation (6) to make the manipulated variable output upper limit value MH1 asymptotically come close to the predetermined value MT1 (step 105). As a result, the preferential controller PID1 can output a larger manipulated variable output MV1. At this time, the transition time Tx1 is the time until the manipulated variable output upper limit value MH1 shifts to the predetermined value MT1 (accurately, the manipulated variable output upper limit value MH1 changes to 63.2% for a time of 100% between the manipulated variable output upper limit value MH1 and the predetermined value MT1).

If inequality (4) is established, i.e., the internal output value UC2 of the non-preferential controller PID2 does not have any margin with respect to the manipulated variable output upper limit value MH2 (UC2>MH2), the manipulated variable output upper limit value MH1 of the preferential controller PID1 is asymptotically adjusted in a direction in which the manipulated variable output upper limit value MH1 decreases by an output shortage (UC2–MV2) of the non-preferential controller PID2 (step 105). This suppresses the manipulated variable output MV1 of the preferential controller PID1. At this time, the transition time Tx1 is the time until the manipulated variable output upper limit value MH1 shifts to UC1–(UC2–MV2).

When inequality (4) is established and the manipulated variable output upper limit value MH1 of the preferential controller PID1 is to be decreased, the output shortage (UC2–MV2) of the non-preferential controller PID2 serving as the decrease index is multiplied by the priority coefficient α. By adjusting the value of the priority coefficient α, excessive precedence of the preferential controller PID1 can be prevented, and the controllability of the non-preferential controller PID2 can also be properly maintained within a possible range.

FIG. 3 shows tables of control operation examples of the controlling device according to the first embodiment. FIG. 3 shows the simulation results of calculating the controlled variables PV1 and PV2 when disturbance is applied in 600 sec and the set point SP1 of the preferential controller PID1 is changed from 30% to 40% in 900 sec.

Figure 3A:
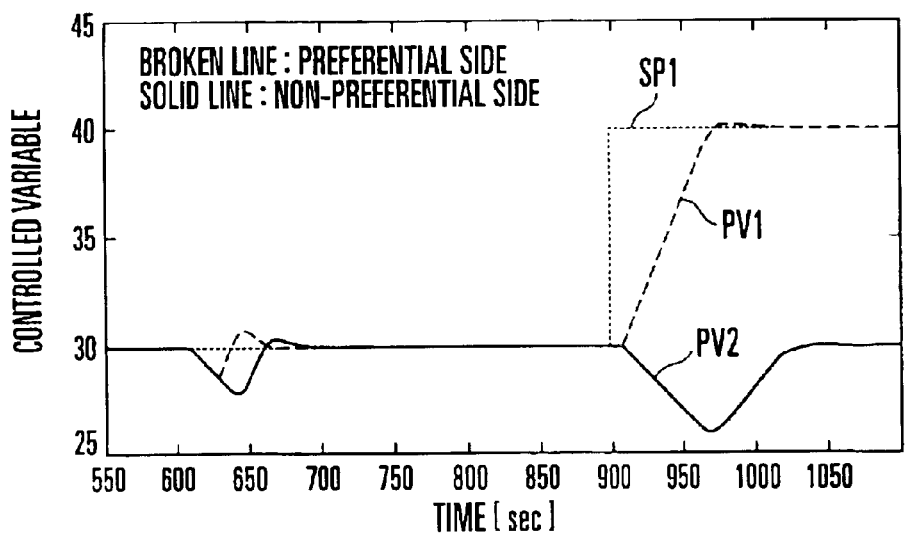
FIG. 3 shows tables of control operation examples of the controlling device in FIG. 1.

As shown in FIG. 3A, for the highest priority of the preferential controller PID1 (α=0), control of the non-preferential controller PID2 degrades when disturbance is applied in the first half of FIG. 3A and the preferential set point SP1 is changed in the second half of FIG. 3A. However, control of the preferential controller PID1 responses fastest.

Figure 3B:
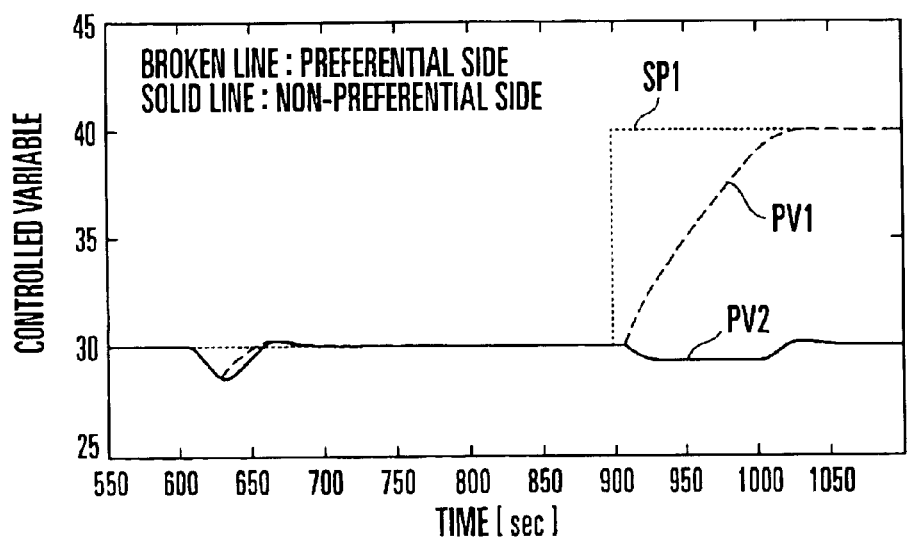

As shown in FIG. 3B, for the lowest priority of the preferential controller PID1 (α=1), control of the non-preferential controller PID2 does not greatly degrade when disturbance is applied in the first half of FIG. 3B and the preferential set point SP1 is changed in the second half of FIG. 3B. However, control of the preferential controller PID1 responses slowly, compared to the fastest response.

In this way, the first embodiment can maintain the sum of the manipulated variable outputs MV1 and MV2 of two loops at the predetermined value MT1 or less, and can maintain the high-priority controlled variable PV1 in a good control state.

In the above-described application, the heater output may be given in time-proportional time division. For example, for two loops of a system having a maximum heater output of 400 W, the sum of the manipulated variable outputs of the two loops is maintained at 100% or less. This requires only a 400-W power equipment (energy supply source) such as a power supply, reducing the apparatus size and cost. If the present invention is not applied, an 800-W power equipment is required.

According to the first embodiment, the first manipulated variable output upper limit value input in advance is limited and given to a preferential controller such that the manipulated variable output of the preferential controller becomes equal to or smaller than a predetermined value representing the manipulated variable output upper limit of the whole apparatus. The second manipulated variable output upper limit is calculated and given to a non-preferential controller such that the sum of the manipulated variable outputs of the preferential and non-preferential controllers becomes equal to or smaller than the predetermined value. Calculation of increasing/decreasing the first manipulated variable output upper limit in accordance with the margin of the manipulated variable output of the non-preferential controller with respect to the second manipulated variable output upper limit is performed. The calculated value is set as the first manipulated variable output upper limit in the next control cycle. Hence, good controllability can be obtained for the preferential controller while maintaining the sum of the manipulated variable outputs of the two loops at the predetermined value or less. The controllability of even the non-preferential controller can also be maintained at a given degree. The controllability and energy consumption amount of each controller can be satisfied within an acceptable range. As a result, the controllability of each controller and downsizing of the controlling device can be met. The usable ability of the controlling device can be fully exploited. When the manipulated variable output of the non-preferential controller does not have any margin with respect to the second manipulated variable output upper limit, the first manipulated variable output upper limit is decreased. The degree of decrease is changed in accordance with the priority of the preferential controller with respect to the non-preferential controller. Excessive precedence of the preferential controller can be prevented, and even the controllability of the non-preferential controller can also be properly maintained within a possible range.

[Second Embodiment]

Figure 4:
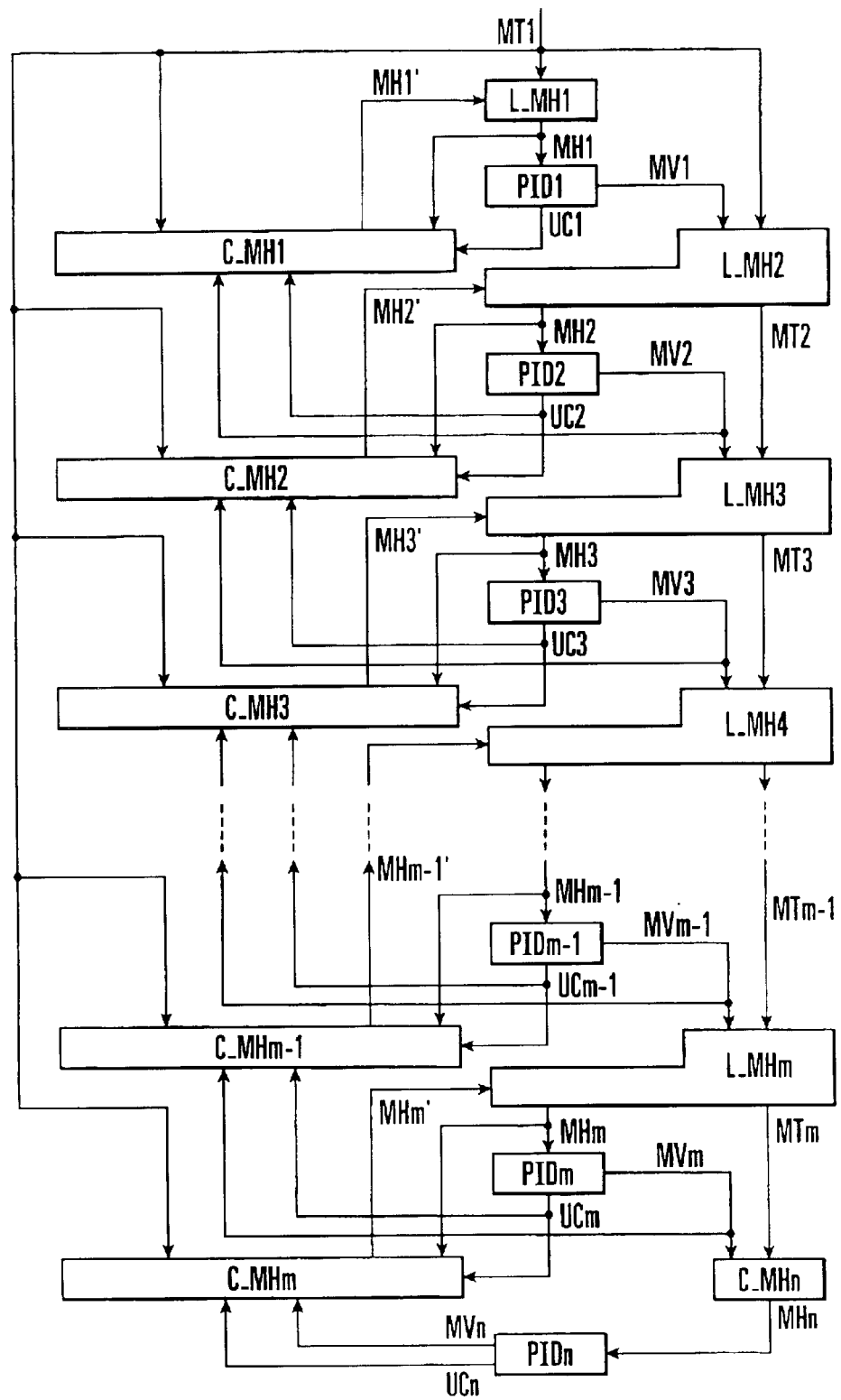
FIG. 4 is a block diagram showing the arrangement of a controlling device according to the second embodiment of the present invention.

FIG. 4 is a block diagram showing the arrangement of a controlling device according to the second embodiment of the present invention. The controlling device in FIG. 4 comprises first to mth preferential controllers PID1 to PIDm assigned the first to mth (m is an integer of 2 or more) priorities, a non-preferential controller (nth controller) PIDn assigned the lowest priority in advance, first to mth preferential upper limit processing sections L_MH1 to L_MHm respectively arranged in correspondence with the preferential controllers PID1 to PIDm, a non-preferential upper limit calculating section C_MHn arranged in correspondence with the non-preferential controller PIDn, and first to mth preferential upper limit calculating sections C_MH1 to C_MHm arranged in correspondence with the preferential controllers PID1 to PIDm.

When the control characteristics of control loops are not so important in accordance with their priorities in an apparatus (semiconductor manufacturing apparatus or the like) having n (n is an integer of 3 or more: n=m+1) loops of a control system using, e.g., an electric heater as an actuator in one apparatus, the second embodiment can be applied to these n loops.

Figure 5:
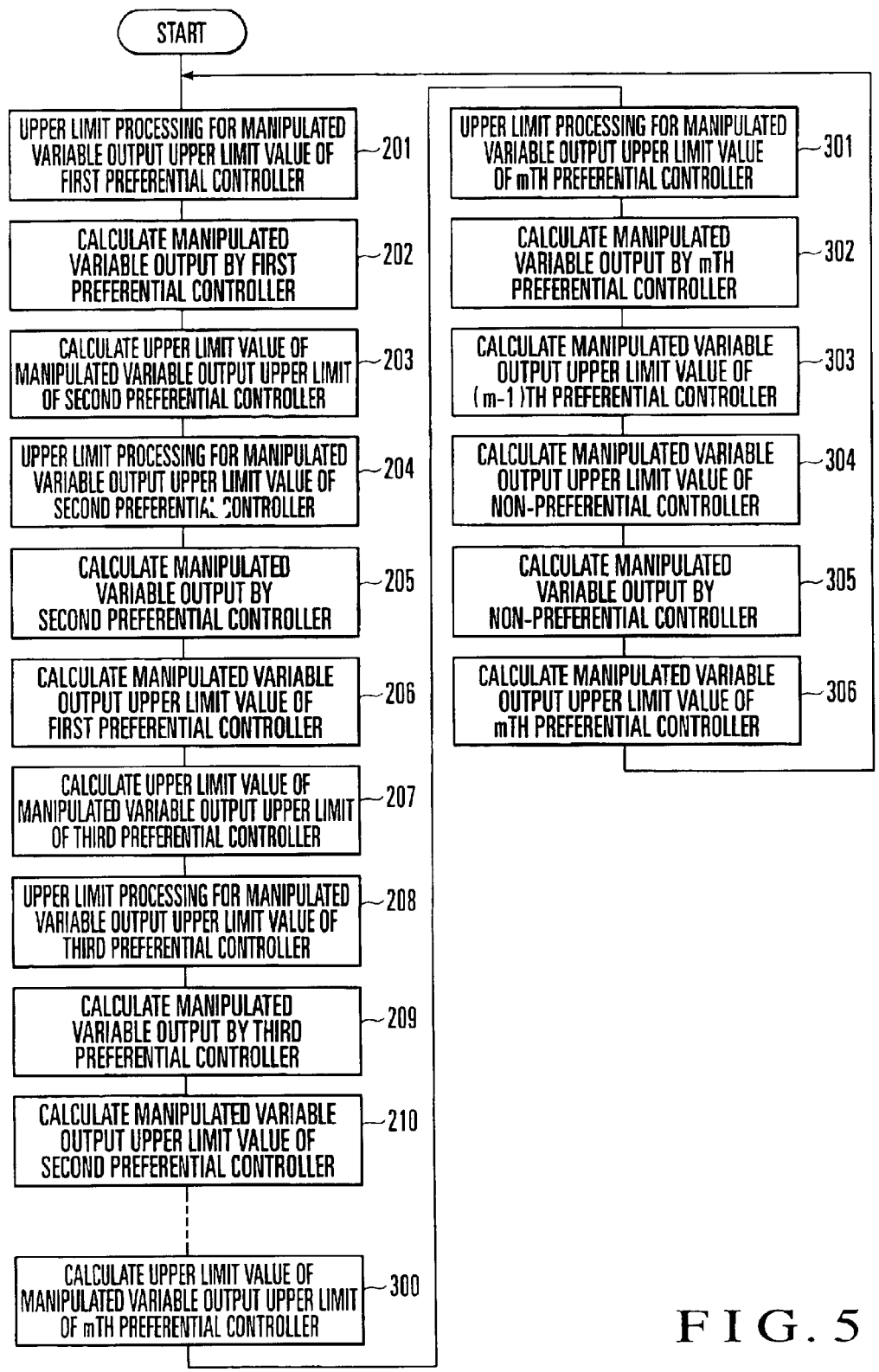
FIG. 5 is a flow chart showing the operation of the controlling device in FIG. 4.

The operation of the controlling device according to the second embodiment will be explained. FIG. 5 is a flow chart showing the operation of the controlling device in FIG. 4. In this case, the priority order is PID1, PID2, PID3, ..., PIDm, and PIDn.

The first preferential upper limit processing section L_MH1 compares a manipulated variable output upper limit value MH1 of the first preferential controller PID1 having the highest priority with a predetermined value MT1 (e.g., 100%). If the manipulated variable output upper limit value MH1 is larger than the predetermined value MT1, the first preferential upper limit processing section L_MH1 executes upper limit processing of setting MH1=MT1, i.e., setting the predetermined value MT1 as a new manipulated variable output upper limit value MH1 (step 201 in FIG. 5).

The first preferential upper limit processing section L_MH1 outputs the updated manipulated variable output upper limit value MH1 to the first preferential controller PID1 and first preferential upper limit calculating section C_MH1. If the manipulated variable output upper limit value MH1 is equal to or smaller than the predetermined value MT1, the first preferential upper limit processing section L_MH1 need not update the manipulated variable output upper limit value MH1 and directly outputs the current manipulated variable output upper limit value MH1.

The first preferential controller PID1 executes PID calculation to calculate the manipulated variable output MV1 (step 202).

In step 202, the first preferential controller PID1 calculates an internal output value UC1 by PID calculation:

$$UC1 = Kg1\{1 + 1/(Ti1\ s) + Td1\ s\}(SP1 - PV1) \qquad (7)$$

The first preferential controller PID1 compares the calculated internal output value UC1 and the manipulated variable output upper limit value MH1 output from the first preferential upper limit processing section L_MH1. If the internal output value UC1 is larger than the manipulated variable output upper limit value MH1, the first preferential controller PID1 executes upper limit processing of setting MV1=MH1, i.e., setting the manipulated variable output upper limit value MH1 as the manipulated variable output MV1. If the internal output value UC1 is equal to or smaller than the manipulated variable output upper limit value MH1, the first preferential controller PID1 sets MV1=UC1, i.e., sets the internal output value UC1 as the manipulated variable output MV1.

The first preferential controller PID1 outputs the calculated manipulated variable output MV1 to an object to be controlled (not shown) and the second preferential upper limit processing section L_MH2. At the same time, the first preferential controller PID1 outputs the internal output value UC1 to the first preferential upper limit calculating section C_MH1.

Processing in step 202 then ends.

The second preferential upper limit processing section L_MH2 calculates an upper limit value MT2 for performing upper limit processing for a manipulated variable output upper limit value MH2 of the second preferential controller PID2 on the basis of the manipulated variable output MV1 output from the first preferential controller PID1 and the predetermined value MT1 (step 203):

$$MT2 = MT1 - MV1 \qquad (8)$$

The second preferential upper limit processing section L_MH2 compares the manipulated variable output upper limit value MH2 of the second preferential controller PID2 and the upper limit value MT2. If the manipulated variable output upper limit value MH2 is larger than the upper limit value MT2, the second preferential upper limit processing section L_MH2 sets MH2=MT2, i.e., the upper limit value MT2 as a new manipulated variable output upper limit value MH2 (step 204).

The second preferential upper limit processing section L_MH2 outputs the updated manipulated variable output upper limit value MH2 to the second preferential controller PID2 and second preferential upper limit calculating section C_MH2. If the manipulated variable output upper limit value MH2 is equal to or smaller than the upper limit value MT2, the second preferential upper limit processing section L_MH2 need not update the manipulated variable output upper limit value MH2, and directly outputs the current manipulated variable output upper limit value MH2.

The second preferential controller PID2 executes PID calculation to calculate a manipulated variable output MV2 (step 205).

In step 205, the second preferential controller PID2 calculates an internal output value UC2 by PID calculation:

$$UC2=Kg2\{1+1/(Ti2\ s)+Td2\ s\}(SP2-PV2) \quad (9)$$

The second preferential controller PID2 compares the calculated internal output value UC2 and the manipulated variable output upper limit value MH2 output from the second preferential upper limit processing section L_MH2. If the internal output value UC2 is larger than the manipulated variable output upper limit value MH2, the second preferential controller PID2 executes upper limit processing of setting MV2=MH2, i.e., setting the manipulated variable output upper limit value MH2 as the manipulated variable output MV2. If the internal output value UC2 is equal to or smaller than the manipulated variable output upper limit value MH2, the second preferential controller PID2 sets MV2=UC2, i.e., sets the internal output value UC2 as the manipulated variable output MV2.

The second preferential controller PID2 outputs the calculated manipulated variable output MV2 to an object to be controlled (not shown), the first preferential upper limit calculating section C_MH1, and the third preferential upper limit processing section L_MH3. At the same time, the second preferential controller PID2 outputs the internal output value UC2 to the first preferential upper limit calculating section C_MH1 and second preferential upper limit calculating section C_MH2.

Processing in step 205 then ends.

The first preferential upper limit calculating section C_MH1 calculates a manipulated variable output upper limit value MH1' in the next control cycle for the first preferential controller PID1 (step 206).

In step 206, the first preferential upper limit calculating section C_MH1 checks whether the following inequality is established on the basis of the internal output value UC2 and manipulated variable output MV2 output from the second preferential controller PID2:

$$\alpha1(UC2-MV2)>0 \quad (10)$$

where α1 is the priority coefficient representing the control priority of the first preferential controller PID1 with respect to the second preferential controller PID2, and takes a real number of 0 to 1 (priority is highest for 0, and lowest for 1).

If inequality (10) is established, the first preferential upper limit calculating section C_MH1 calculates by the following equation the manipulated variable output upper limit value MH1' in the next control cycle for the first preferential controller PID1 on the basis of the manipulated variable output upper limit value MH1 in the current control cycle output from the first preferential upper limit processing section L_MH1, the internal output value UC1 output from the first preferential controller PID1, and the manipulated variable output MV2 and internal output value UC2 output from the second preferential controller PID2. The first preferential upper limit calculating section C_MH1 outputs the manipulated variable output upper limit value MH1' to the first preferential upper limit processing section L_MH1:

$$MH1'=[MH1\ Tx1+\{UC1-\alpha1(UC2-MV2)\}dT]/(Tx1+dT) \quad (11)$$

If inequality (10) is not established, the first preferential upper limit calculating section C_MH1 calculates the manipulated variable output upper limit value MH1' on the basis of the predetermined value MT1, and the manipulated variable output upper limit value MH1 in the current control cycle output from the first preferential upper limit processing section L_MH1, and outputs the manipulated variable output upper limit value MH1' to the first preferential upper limit processing section L_MH1:

$$MH1'=[MH1\ Tx1+MT1\ dT]/(Tx1+dT) \quad (12)$$

Processing in step 206 then ends.

The third preferential upper limit processing section L_MH3 calculates an upper limit value MT3 for performing upper limit processing for a manipulated variable output upper limit value MH3 of the third preferential controller PID3 on the basis of the manipulated variable output MV2 output from the second preferential controller PID2 and the upper limit value MT2 output from the second preferential upper limit processing section L_MH2 (step 207):

$$MT3=MT2-MV2 \quad (13)$$

The third preferential upper limit processing section L_MH3 compares the manipulated variable output upper limit value MH3 of the third preferential controller PID3 and the upper limit value MT3. If the manipulated variable output upper limit value MH3 is larger than the upper limit value MT3, the third preferential upper limit processing section L_MH3 sets MH3=MT3, i.e., the upper limit value MT3 as a new manipulated variable output upper limit value MH3 (step 208).

The third preferential upper limit processing section L_MH3 outputs the updated manipulated variable output upper limit value MH3 to the third preferential controller PID3 and third preferential upper limit calculating section C_MH3. If the manipulated variable output upper limit value MH3 is equal to or smaller than the upper limit value MT3, the third preferential upper limit processing section L_MH3 need not update the manipulated variable output upper limit value MH3, and directly outputs the current manipulated variable output upper limit value MH3.

The third preferential controller PID3 executes PID calculation to calculate a manipulated variable output MV3 (step 209).

In step 209, the third preferential controller PID3 calculates an internal output value UC3 by PID calculation:

$$UC3=Kg3\{1+1/(Ti3\ s)+Td3\ s\}(SP3-PV3) \quad (14)$$

where Kg3, Ti3, and Td3 are the proportional gain, integral time, and derivative time of the controller PID3, SP3 is the set point set for an object (not shown) to be controlled by the controller PID3, and PV3 is the controlled variable of this object. The proportional gain Kg3, integral time Ti3, derivative time Td3, and set point SP3 are set in advance, and the controlled variable PV3 is detected by a sensor (not shown).

The third preferential controller PID3 compares the calculated internal output value UC3 and the manipulated variable output upper limit value MH3 output from the third preferential upper limit processing section L__MH3. If the internal output value UC3 is larger than the manipulated variable output upper limit value MH3, the third preferential controller PID3 executes upper limit processing of setting MV3=MH3, i.e., setting the manipulated variable output upper limit value MH3 as the manipulated variable output MV3. If the internal output value UC3 is equal to or smaller than the manipulated variable output upper limit value MH3, the third preferential controller PID3 sets MV3=UC3, i.e., sets the internal output value UC3 as the manipulated variable output MV3.

The third preferential controller PID3 outputs the calculated manipulated variable output MV3 to an object to be controlled (not shown), the second preferential upper limit calculating section C__MH2, and the fourth preferential upper limit processing section L__MH4. At the same time, the third preferential controller PID3 outputs the internal output value UC3 to the second preferential upper limit calculating section C__MH2 and third preferential upper limit calculating section C__MH3.

Processing in step 209 then ends.

The second preferential upper limit calculating section C__MH2 calculates a manipulated variable output upper limit value MH2' in the next control cycle for the second preferential controller PID2 (step 210).

In step 210, the second preferential upper limit calculating section C__MH2 checks whether the following inequality is established on the basis of the internal output value UC3 and manipulated variable output MV3 output from the third preferential controller PID3:

$$\alpha 2(UC3-MV3)>0 \quad (15)$$

where $\alpha 2$ is the priority coefficient representing the control priority of the second preferential controller PID2 with respect to the third preferential controller PID3, and takes a real number of 0 to 1 (priority is highest for 0, and lowest for 1).

If inequality (15) is established, the second preferential upper limit calculating section C__MH2 calculates by the following equation the manipulated variable output upper limit value MH2' in the next control cycle for the second preferential controller PID2 on the basis of the manipulated variable output upper limit value MH2 in the current control cycle output from the second preferential upper limit processing section L__MH2, the internal output value UC2 output from the second preferential controller PID2, and the manipulated variable output MV3 and internal output value UC3 output from the third preferential controller PID3. The second preferential upper limit calculating section C__MH2 outputs the manipulated variable output upper limit value MH2' to the second preferential upper limit processing section L__MH2:

$$MH2'=[MH2\ Tx2+\{UC2-\alpha 2(UC3-MV3)\}dT]/(Tx2+dT) \quad (16)$$

where Tx2 is the transition time and, e.g., Tx2=Td2.

If inequality (15) is not established, the second preferential upper limit calculating section C__MH2 calculates the manipulated variable output upper limit value MH2' on the basis of the predetermined value MT1, and the manipulated variable output upper limit value MH2 in the current control cycle output from the second preferential upper limit processing section L__MH2, and outputs the manipulated variable output upper limit value MH2' to the second preferential upper limit processing section L__MH2:

$$MH2'=[MH2\ Tx2+MT1\ dT]/(Tx2+dT) \quad (17)$$

Processing in step 210 then ends.

The same processes as those in steps 203 to 206 and 207 to 210 are repeated, and the mth preferential upper limit calculating section C__MHm calculates a manipulated variable output upper limit value MHm' in the next control cycle for the mth preferential controller PIDm. After that, the mth preferential upper limit processing section L__MHm calculates an upper limit value MTm for performing upper limit processing for a manipulated variable output upper limit value MHm of the mth preferential controller PIDm on the basis of a manipulated variable output MVm−1 output from the (m−1)th preferential controller PIDm−1 and an upper limit value MTm−1 output from the (m−1)th preferential upper limit processing section L__MHm−1 (not shown) (step 300):

$$MTm=MTm-1-MVm-1 \quad (18)$$

The mth preferential upper limit processing section L__MHm compares the manipulated variable output upper limit value MHm of the mth preferential controller PIDm and the upper limit value MTm. If the manipulated variable output upper limit value MHm is larger than the upper limit value MTm, the mth preferential upper limit processing section L__MHm sets MHm=MTm, i.e., the upper limit value MTm as a new manipulated variable output upper limit value MHm (step 301).

The mth preferential upper limit processing section L__MHm outputs the updated manipulated variable output upper limit value MHm to the mth preferential controller PIDm and mth preferential upper limit calculating section C__MHm. If the manipulated variable output upper limit value MHm is equal to or smaller than the upper limit value MTm, the mth preferential upper limit processing section L__MHm need not update the manipulated variable output upper limit value MHm, and directly outputs the current manipulated variable output upper limit value MHm.

The mth preferential controller PIDm executes PID calculation to calculate a manipulated variable output MVm (step 302).

In step 302, the mth preferential controller PIDm calculates an internal output value UCm by PID calculation:

$$UCm=Kgm\{1+1/(Tim\ s)+Tdm\ s\}(SPm-PVm) \quad (19)$$

where Kgm, Tim, and Tdm are the proportional gain, integral time, and derivative time of the controller PIDm, SPm is the set point set for an object (not shown) to be controlled by the controller PIDm, and PVm is the controlled variable of this object. The proportional gain Kgm, integral time Tim, derivative time Tdm, and set point SPm are set in advance, and the controlled variable PVm is detected by a sensor (not shown).

The mth preferential controller PIDm compares the calculated internal output value UCm and the manipulated variable output upper limit value MHm output from the mth preferential upper limit processing section L__MHm. If the internal output value UCm is larger than the manipulated variable output upper limit value MHm, the mth preferential controller PIDm executes upper limit processing of setting MVm=MHm, i.e., setting the manipulated variable output upper limit value MHm as the manipulated variable output MVm. If the internal output value UCm is equal to or smaller than the manipulated variable output upper limit value MHm, the mth preferential controller PIDm sets MVm=UCm, i.e., sets the internal output value UCm as the manipulated variable output MVm.

The mth preferential controller PIDm outputs the calculated manipulated variable output MVm to an object to be controlled (not shown), the (m−1)th preferential upper limit calculating section C_MHm−1, and the non-preferential upper limit calculating section C_MHn. At the same time, the mth preferential controller PIDm outputs the internal output value UCm to the (m−1)th preferential upper limit calculating section C_MHm−1 and mth preferential upper limit calculating section C_MHm.

Processing in step 302 then ends.

The (m−1)th preferential upper limit calculating section C_MHm−1 calculates a manipulated variable output upper limit value MHm−1' in the next control cycle for the (m−1)th preferential controller PIDm−1 (step 303).

In step 303, the (m−1)th preferential upper limit calculating section C_MHm−1 checks whether the following inequality is established on the basis of the internal output value UCm and manipulated variable output MVm output from the mth preferential controller PIDm:

$$\alpha m-1(UCm-Mvm)>0 \quad (20)$$

where $\alpha m-1$ is the priority coefficient representing the control priority of the (m−1)th preferential controller PIDm−1 with respect to the mth preferential controller PIDm, and takes a real number of 0 to 1 (priority is highest for 0, and lowest for 1).

If inequality (20) is established, the (m−1)th preferential upper limit calculating section C_MHm−1 calculates by the following equation the manipulated variable output upper limit value MHm−1' in the next control cycle for the (m−1)th preferential controller PIDm−1 on the basis of the manipulated variable output upper limit value MHm−1 in the current control cycle output from the (m−1)th preferential upper limit processing section L_MHm−1, the internal output value UCm−1 output from the (m−1)th preferential controller PIDm−1, and the manipulated variable output MVm and internal output value UCm output from the mth preferential controller PIDm. The (m−1)th preferential upper limit calculating section C_MHm−1 outputs the manipulated variable output upper limit value MHm−1' to the (m−1)th preferential upper limit processing section L_MHm−1:

$$MHm-1'=[MHm-1Txm-1+\{UCm-1-\alpha m-1(UCm-MVm)\}dT]/(Txm-1+dT) \quad (21)$$

where Txm−1 is the transition time and, e.g., Txm−1=Tdm−1.

If inequality (20) is not established, the (m−1)th preferential upper limit calculating section C_MHm−1 calculates the manipulated variable output upper limit value MHm−1' on the basis of the predetermined value MT1, and the manipulated variable output upper limit value MHm−1 in the current control cycle output from the (m−1)th preferential upper limit processing section L_MHm−1, and outputs the manipulated variable output upper limit value MHm−1' to the (m−1)th preferential upper limit processing section L_MHm−1:

$$MHm-1'=[MHm-1Txm-1+MT1\ dT]/(Txm-1+dT) \quad (22)$$

Processing in step 303 then ends.

The non-preferential upper limit calculating section C_MHn calculates a manipulated variable output upper limit value MHn representing the upper limit of a manipulated variable output MVn from the non-preferential controller PIDn on the basis of the manipulated variable output MVm output from the mth preferential controller PIDm and the upper limit value MTm output from the mth preferential upper limit processing section L_MHm, and outputs the manipulated variable output upper limit value MHn to the non-preferential controller PIDn (step 304):

$$MHn=MTm-MVm \quad (23)$$

The non-preferential controller PIDn executes PID calculation to calculate the manipulated variable output MVn (step 305).

In step 305, the non-preferential controller PIDn calculates an internal output value UCn by PID calculation:

$$UCn=Kgn\{1+1/(Tin\ s)+Tdn\ s\}(SPn-PVn) \quad (24)$$

where Kgn, Tin, and Tdn are the proportional gain, integral time, and derivative time of the controller PIDn, SPn is the set point set for an object (not shown) to be controlled by the controller PIDn, and PVn is the controlled variable of this object. The proportional gain Kgn, integral time Tin, derivative time Tdn, and set point SPn are set in advance, and the controlled variable PVn is detected by a sensor (not shown).

The non-preferential controller PIDn compares the calculated internal output value UCn and the manipulated variable output upper limit value MHn output from the non-preferential upper limit calculating section C_MHn. If the internal output value UCn is larger than the manipulated variable output upper limit value MHn, the non-preferential controller PIDn executes upper limit processing of setting MVn=MHn, i.e., setting the manipulated variable output upper limit value MHn as the manipulated variable output MVn. If the internal output value UCn is equal to or smaller than the manipulated variable output upper limit value MHn, the non-preferential controller PIDn sets MVn=UCn, i.e., sets the internal output value UCn as the manipulated variable output MVn.

The non-preferential controller PIDn outputs the calculated manipulated variable output MVn to the object to be controlled (not shown) and the mth preferential upper limit calculating section C_MHm. At the same time, the non-preferential controller PIDn outputs the internal output value UCn to the preferential upper limit calculating section C_MHm.

Processing in step 305 then ends.

The mth preferential upper limit calculating section C_MHm calculates a manipulated variable output upper limit value MHm' in the next control cycle for the mth preferential controller PIDm (step 306).

In step 306, the preferential upper limit calculating section C_MHm checks whether the following inequality is established on the basis of the internal output value UCn and manipulated variable output MVn output from the non-preferential controller PIDn:

$$\alpha m(UCn-MVn)>0 \quad (25)$$

where $\alpha m$ is the priority coefficient representing the control priority of the mth preferential controller PIDm with respect to the non-preferential controller PIDn, and takes a real number of 0 to 1 (priority is highest for 0, and lowest for 1).

If inequality (25) is established, the mth preferential upper limit calculating section C_MHm calculates by the following equation the manipulated variable output upper limit value MHm' in the next control cycle for the preferential controller PIDm on the basis of the manipulated variable output upper limit value MHm in the current control cycle output from the mth preferential upper limit processing section L_MHm, the internal output value UCm output from the mth preferential controller PIDm, and the manipulated variable output MVn and internal output value UCn output from the non-preferential controller PIDn. The mth preferential upper limit calculating section C_MHm outputs the manipulated variable output upper limit value MHm' to the mth preferential upper limit processing section L_MHm:

$$MHm'=[MHm\ Txm+\{UCm-\alpha m(UCn-MVn)\}dT]/(Txm+dT) \quad (26)$$

where Txm is the transition time and, e.g., Txm=Tdm.

If inequality (25) is not established, the preferential upper limit calculating section C_MHm calculates the manipulated variable output upper limit value MHm' on the basis of the predetermined value MT1, and the manipulated variable output upper limit value MHm in the current control cycle output from the mth preferential upper limit processing section L_MHm, and outputs the manipulated variable output upper limit value MHm' to the preferential upper limit processing section L_MHm:

$$MHm'=[MHm\ Txm+MT1\ dT]/(Txm+dT) \quad (27)$$

Processing in step 306 then ends.

Steps 201 to 306 are defined as processing in one control cycle, and processing from step 201 to step 306 is repeated every control cycle dT.

Note that the ith (i=1 to m) preferential upper limit processing section L_MHi executes processes in steps 201, 204, 208, and 301 by setting MHi=MHi', i.e., setting, as the manipulated variable output upper limit value MHi in the current control cycle, the manipulated variable output upper limit value MHi' calculated and output from the ith preferential upper limit calculating section C_MHi in the preceding control cycle.

In this fashion, in the second embodiment, the manipulated variable output upper limit value MH2 of the second preferential controller PID2 is set to MT1−MV1 (step 203), . . . , the manipulated variable output upper limit value MH3 of the third preferential controller PID3 is set to MT1−MV1−MV2 (step 207), . . . , the manipulated variable output upper limit value MHn of the non-preferential controller PIDn is set to MTm−MVm (step 304) in order to always maintain the sum of the manipulated variable output MV1 of the first preferential controller PID1, the manipulated variable output MV2 of the second preferential controller PID2, . . . , the output MVn of the non-preferential controller PIDn at the predetermined value MT1 or less.

If inequality (10) is not established, i.e., the internal output value UC2 of the non-preferential controller PID2 has a margin with respect to the manipulated variable output upper limit value MH2 (UC2≦MH2), the manipulated variable output upper limit value MH1 of the first preferential controller PID1 is increased using equation (12) to make the manipulated variable output upper limit value MH1 asymptotically come close to the predetermined value MT1 (step 206). As a result, the first preferential controller PID1 can output a larger manipulated variable output MV1.

If inequality (10) is established, i.e., the internal output value UC2 of the second preferential controller PID2 does not have any margin with respect to the manipulated variable output upper limit value MH2 (UC2>MH2), the manipulated variable output upper limit value MH1 of the first preferential controller PID1 is asymptotically adjusted in a direction in which the manipulated variable output upper limit value MH1 decreases by an output shortage (UC2−MV2) of the second preferential controller PID2 (step 206). This suppresses the manipulated variable output MV1 of the first preferential controller PID1. When inequality (10) is established and the manipulated variable output upper limit value MH1 of the first preferential controller PID1 is to be decreased, the output shortage (UC2−MV2) of the second preferential controller PID2 serving as the decrease index is multiplied by the priority coefficient $\alpha 1$. By adjusting the value of the priority coefficient $\alpha 1$, excessive precedence of the first preferential controller PID1 can be prevented, and the controllability of the second preferential controller PID2 can also be properly maintained within a possible range.

Similarly, when the manipulated variable output MVj+1 of the (j+1)th controller PIDj+1 has a margin with respect to the (j+1)th (j is an integer of 2 to m) manipulated variable output upper limit MHj+1, the manipulated variable output upper limit MHj of the jth controller PID1 is increased to make the manipulated variable output upper limit MHj asymptotically come close to the predetermined value MT1. Thus, the jth controller PIDj can output a larger manipulated variable output MVj.

When the manipulated variable output MVj+1 of the (j+1)th controller PIDj+1 does not have any margin with respect to the (j+1)th manipulated variable output upper limit MHj+1, the manipulated variable output upper limit MHj of the jth controller PIDj is asymptotically adjusted in a direction in which the manipulated variable output upper limit MHj decreases by an output shortage (UCj+1−MVj+1) of the (j+1)th controller PIDj+1. This suppresses the manipulated variable output MVj of the jth controller PIDj.

In decreasing the manipulated variable output upper limit value MHj of the jth controller PIDj, the output shortage (UCj+1−MVj+1) of the (j+1)th controller PIDj+1 serving as the decrease index is multiplied by the priority coefficient $\alpha j$. By adjusting the value of the priority coefficient $\alpha j$, excessive precedence of the jth controller PIDj can be prevented, and the controllability of the (j+1)th controller PIDj+1 can also be properly maintained within a possible range.

In this way, the second embodiment can maintain the sum of the manipulated variable outputs MV1, MV2, . . . , MVn of n loops at the predetermined value MT1 or less, and can maintain a high-priority controlled variable in a good control state.

In the above-described application, the heater output may be given in time-proportional time division. For example, for four loops of a system having a maximum heater output of 400 W, the sum of the manipulated variable outputs of the four loops is maintained at 100% or less. This requires only a 400-W power equipment such as a power supply, reducing the apparatus size and cost. If the present invention is not applied, a 1,600-W power equipment is required.

In the second embodiment, the manipulated variable output upper limit values MH1, MH2, MH3, . . . , MHm in the first control cycle are set to, e.g., 100%.

According to the second embodiment, the kth manipulated variable output upper limit value input in advance is limited and given to the kth controller such that the sum of the manipulated variable outputs of the first to kth (k is an integer of 1 to m) controllers becomes equal to or smaller than a predetermined value representing the manipulated variable output upper limit of the whole apparatus. The nth manipulated variable output upper limit is calculated and given to the nth controller such that the sum of the manipulated variable outputs of the first to mth and nth controllers becomes equal to or smaller than the predetermined value. Calculation of increasing/decreasing the kth manipulated variable output upper limit in accordance with the margin of the manipulated variable output of the (k+1)th controller with respect to the (k+1)th manipulated variable output upper limit is performed. The calculated value is set as the kth manipulated variable output upper limit in the next control cycle. Hence, good controllability can be obtained for the preferential controller while maintaining the sum of the manipulated variable outputs of the n loops at the predetermined value or less. The controllability of even the non-preferential controller can also be maintained at a given degree. The controllability and energy consumption amount of each controller can be satisfied within an acceptable range. As a result, the controllability of each controller and downsizing of the controlling device can be met. The usable ability of the controlling device can be fully exploited. When the manipulated variable output of the (k+1)th controller does not have any margin with respect to the (k+1)th manipulated variable output upper limit, the kth manipulated variable output upper limit is decreased. The degree of decrease is changed in accordance with the priority of the kth controller with respect to the (k+1)th controller. Excessive precedence of the kth controller can be prevented, and even the controllability of the (k+1)th controller can also be properly maintained within a possible range.

As has been described above, the present invention is suitable for control using a plurality of controllers.

What is claimed is:

1. A controlling device which performs control using two controllers within a predetermined energy consumption amount, characterized by comprising:

(1) a preferential controller which calculates a manipulated variable output in accordance with a first manipulated variable output upper limit;

(2) a non-preferential controller which calculates a manipulated variable output in accordance with a second manipulated variable output upper limit;

(3) a preferential upper limit processing section which limits a value of the first manipulated variable output upper limit input in advance and gives the first manipulated variable output upper limit to said preferential controller so as to adjust the manipulated variable output of said preferential controller to not more than a predetermined value representing a manipulated variable output upper limit of a whole apparatus;

(4) a non-preferential upper limit calculating section which calculates the second manipulated variable output upper limit and gives the second manipulated variable output upper limit to said non-preferential controller so as to adjust a sum of the manipulated variable outputs of said preferential and non-preferential controllers to not more than the predetermined value; and (5) a preferential upper limit calculating section which performs calculation of increasing/decreasing the first manipulated variable output upper limit in accordance with a margin of the manipulated variable output of said non-preferential controller with respect to the second manipulated variable output upper limit, and gives a calculated value as the first manipulated variable output upper limit in a next control cycle to said preferential upper limit processing section.

2. A controlling device according to claim 1, characterized in that said preferential upper limit calculating section increases the first manipulated variable output upper limit when the manipulated variable output of said non-preferential controller has a margin with respect to the second manipulated variable output upper limit, decreases the first manipulated variable output upper limit when the manipulated variable output does not have any margin, and changes a degree of decrease in accordance with priority of said preferential controller with respect to said non-preferential controller.

3. A controlling device which performs control using n (n is an integer of not less than three) controllers within a predetermined energy consumption amount, characterized by comprising:

(1) first to mth controllers which are assigned first to mth (m is n−1) priorities in advance and calculate manipulated variable outputs in accordance with first to mth corresponding manipulated variable output upper limits;

(2) an nth controller which is assigned a lowest priority in advance and calculates a manipulated variable output in accordance with an nth manipulated variable output upper limit;

(3) first to mth preferential upper limit processing sections which are arranged for k (k is an integer of 1 to m) controllers, limit a value of a kth manipulated variable output upper limit input in advance, and give the k manipulated variable output upper limit to a kth controller so as to adjust a sum of the manipulated variable outputs of said first to kth controllers to not more than a predetermined value representing a manipulated variable output upper limit of a whole apparatus;

(4) a non-preferential upper limit calculating section which calculates the nth manipulated variable output upper limit and gives the nth manipulated variable output upper limit to said nth controller so as to adjust a sum of the manipulated variable outputs of said first to mth and nth controllers to not more than the predetermined value; and (5) first to mth preferential upper limit calculating sections which are arranged for the k controllers, perform calculation of increasing/decreasing the k manipulated variable output upper limit in accordance with a margin of the manipulated variable outputs of a (k+1)th controller with respect to a (k+1)th manipulated variable output upper limit, and give a calculated value as the kth manipulated variable output upper limit in a next control cycle to a kth preferential upper limit processing section.

4. A controlling device according to claim 3, characterized in that said kth preferential upper limit calculating section for said kth controller increases the kth manipulated variable output upper limit when the manipulated variable output of said (k+1)th controller has a margin with respect to the (k+1)th manipulated variable output upper limit, decreases the kth manipulated variable output upper limit when the manipulated variable output does not have any margin, and changes a degree of decrease in accordance with priority of said kth controller with respect to said (k+1)th controller.

5. In a controlling device which performs control using two, preferential and non-preferential controllers within a predetermined energy consumption amount, a control method characterized by comprising repetitively performing:

(1) preferential upper limit processing of limiting a value of a first manipulated variable output upper limit input in advance so as to adjust a manipulated variable output of the preferential controller to not more than a predetermined value representing a manipulated variable output upper limit of a whole apparatus;

(2) preferential manipulated variable output calculation processing of calculating a manipulated variable output by the preferential controller in accordance with the first manipulated variable output upper limit;

(3) non-preferential upper limit calculation processing of calculating a second manipulated variable output upper limit so as to adjust a sum of manipulated variable outputs of the preferential and non-preferential controllers to not more than the predetermined value;

(4) non-preferential manipulated variable output calculation processing of calculating a manipulated variable output by the non-preferential controller in accordance with the second manipulated variable output upper limit; and (5) preferential upper limit calculation processing of performing calculation of increasing/decreasing the first manipulated variable output upper limit in accordance with a margin of the manipulated variable output of the non-preferential controller with respect to the second manipulated variable output upper limit, and giving a calculated value as the first manipulated variable output upper limit in a next control cycle to the preferential upper limit processing.

6. A controlling method according to claim 5, characterized in that the preferential upper limit calculation processing includes processing of increasing the first manipulated variable output upper limit when the manipulated variable output of the non-preferential controller has a margin with respect to the second manipulated variable output upper limit, decreasing the first manipulated variable output upper limit when the manipulated variable output does not have any margin, and changing a degree of decrease in accordance with priority of the preferential controller with respect to the non-preferential controller.

7. In a controlling device which performs control using n controllers assigned first to nth (n is an integer of not less than three) priorities in advance within a predetermined energy consumption amount, a control method characterized by comprising:

performing (1) first preferential upper limit processing of limiting a value of a first manipulated variable output upper limit input in advance so as to adjust a manipulated variable output of a first controller to not more than a predetermined value representing a manipulated variable output upper limit of a whole apparatus, (2) first preferential manipulated variable output calculation processing of calculating a manipulated variable output by the first controller in accordance with the first manipulated variable output upper limit, (3) second preferential upper limit processing of calculating a second manipulated variable output upper limit so as to adjust a sum of manipulated variable outputs of the first controller and a second controller to not more than the predetermined value, (4) second preferential manipulated variable output calculation processing of calculating a manipulated variable output by the second controller in accordance with the second manipulated variable output upper limit, and (5) first preferential upper limit calculation processing of performing calculation of increasing/decreasing the first manipulated variable output upper limit in accordance with a margin of the manipulated variable output of the second controller with respect to the second manipulated variable output upper limit, and giving a calculated value as the first manipulated variable output upper limit in a next control cycle to the first preferential upper limit processing;

sequentially performing (6) three processes for i (i is an integer of 3 to m) controllers: ith preferential upper limit processing of limiting a value of an ith manipulated variable output upper limit input in advance so as to adjust a sum of manipulated variable outputs of the first to ith controllers to not more than the predetermined value, ith preferential manipulated variable output calculation processing of calculating the manipulated variable output by the ith controller in accordance with the ith manipulated variable output upper limit, and (i−1)th preferential upper limit calculation processing of performing calculation of increasing/decreasing an (i−1)th manipulated variable output upper limit in accordance with a margin of the manipulated variable output of the ith controller with respect to the ith manipulated variable output upper limit, and giving a calculated value as the (i−1)th manipulated variable output upper limit in a next control cycle to the (i−1)th preferential upper limit processing;

performing (7) non-preferential upper limit calculation processing of calculating an nth manipulated variable output upper limit so as to adjust a sum of manipulated variable outputs of the first to mth and nth controllers to not more than the predetermined value, (8) non-preferential manipulated variable output calculation processing of calculating a manipulated variable output by the nth controller in accordance with the nth manipulated variable output upper limit, and (9) mth preferential upper limit calculation processing of performing calculation of increasing/decreasing an mth manipulated variable output upper limit in accordance with a margin of the manipulated variable output of the nth controller with respect to the nth manipulated variable output upper limit, and giving a calculated value as the mth manipulated variable output upper limit in a next control cycle to mth preferential upper limit processing; and repetitively performing processing in (1) to (9).

8. A controlling method according to claim 7, characterized in that kth preferential upper limit calculation processing for the kth (k is an integer of 1 to m) controller includes processing of increasing the kth manipulated variable output upper limit when a manipulated variable output of the (k+1)th controller has a margin with respect to the (k+1)th manipulated variable output upper limit, decreasing the kth manipulated variable output upper limit when the manipulated variable output does not have any margin, and changing a degree of decrease in accordance with priority of the kth controller with respect to the (k+1)th controller.

* * * * *